US007210675B2

(12) United States Patent
Montague et al.

(10) Patent No.: US 7,210,675 B2
(45) Date of Patent: May 1, 2007

(54) VERSATILE PALLETIZED WORK HOLDING SYSTEM

(75) Inventors: James M. Montague, Clio, MI (US); Gary Montague, Clio, MI (US); Joel Montague, Clio, MI (US); Douglas Franklin, Clio, MI (US); Brett May, Clio, MI (US)

(73) Assignee: Montague Tool & Manufacturing, Clio, MI (US)

( * ) Notice: Subject to any disclaimer, the term of this patent is extended or adjusted under 35 U.S.C. 154(b) by 273 days.

(21) Appl. No.: 10/363,185

(22) PCT Filed: Sep. 4, 2001
(Under 37 CFR 1.47)

(86) PCT No.: PCT/US01/27498

§ 371 (c)(1),
(2), (4) Date: Jul. 29, 2003

(87) PCT Pub. No.: WO02/20374

PCT Pub. Date: Mar. 14, 2002

(65) Prior Publication Data
US 2004/0113345 A1    Jun. 17, 2004

Related U.S. Application Data

(60) Provisional application No. 60/230,115, filed on Sep. 5, 2000.

(51) Int. Cl.
*B23Q 3/00* (2006.01)
(52) U.S. Cl. .......................................... 269/20; 269/309
(58) Field of Classification Search ................ 269/309, 269/303, 289 R, 298, 32
See application file for complete search history.

(56) References Cited

U.S. PATENT DOCUMENTS

| 4,075,753 A | 2/1978 | Gusching et al. ............. 29/568 |
| 4,151,984 A | 5/1979 | Zapart ............................ 269/9 |
| 4,153,239 A | 5/1979 | La Rocco .................... 269/287 |
| 4,611,960 A | 9/1986 | Quenneville et al. ........ 409/234 |
| 4,612,946 A * | 9/1986 | Noh et al. ...................... 134/62 |
| 4,896,869 A | 1/1990 | Takekoshi ..................... 269/60 |
| 4,898,238 A | 2/1990 | Grantom ..................... 166/75.1 |
| 5,619,818 A | 4/1997 | Fredericksen ..................... 43/4 |
| 5,647,707 A | 7/1997 | Poulin ......................... 409/189 |
| 5,743,685 A | 4/1998 | Piggott ........................ 409/131 |
| 5,788,225 A | 8/1998 | Iwata et al. .................. 269/309 |
| 6,062,554 A | 5/2000 | Leonard ...................... 269/153 |
| 6,099,215 A | 8/2000 | Piggott ........................ 409/131 |
| 6,149,357 A | 11/2000 | Skellon ....................... 409/132 |
| 6,149,358 A | 11/2000 | Montague ................... 409/225 |
| 6,161,826 A | 12/2000 | Forrer ......................... 269/309 |

(Continued)

*Primary Examiner*—Lee D. Wilson
(74) *Attorney, Agent, or Firm*—Santangelo Law Offices, P.C.

(57) ABSTRACT

A versatile palletized system provides for work to be held in place even while a top plate (7) as one type of workholder web is transferred. Movement can be provided by a coordinated topographically fixed movement web (39) which may have hydraulic pistons or other movement mechanisms (11) which cause actuation of a great variety of workholder devices (8) which may be attached to the workholder web (7). Accurate, repeatable positioning between the two webs can be accomplished for quick changeout and even configuration as a rotatable pallet system where one pallet can be set up while the other is being used.

4 Claims, 14 Drawing Sheets

U.S. PATENT DOCUMENTS

| | | | |
|---|---|---|---|
| 6,174,114 B1 | 1/2001 | Stark | 409/225 |
| 6,206,622 B1 | 3/2001 | Witte et al. | 409/225 |
| 6,955,347 B2 * | 10/2005 | Kawakami et al. | 269/309 |
| 2004/0113345 A1 * | 6/2004 | Montague et al. | 269/309 |

* cited by examiner

VERSATILE PALLETIZED WORK HOLDING SYSTEM

This application is a U.S. National Stage Application of International Application No. PCT/US01/27498, filed Sep. 4, 2001, which claims the benefit of and priority to U.S. application No. 60/230,115 filed Sep. 5, 2000, PCT Application PCT/US01/27498 being filed while Original U.S. application Ser. No. 60/230,115 was pending, each hereby incorporated by reference.

TECHNICAL FIELD

Generally, this invention relates to a system of work holding that allows for holding either single or multiple parts that can be loaded and unloaded outside of the work environment, secured and released automatically, and changed over to accommodate a different kind of part in a quick, accurate, and efficient manner. These inventions also address techniques and methods of holding parts for manufacturing on a machining center.

BACKGROUND

In the desire to increase production, quality and competitiveness, people have sought many means to hold a part or parts so that it can be machined accurately and quickly. Most of the time the industry uses a vice, collets, chucks, over center clamping or custom designed fixtures. While these devices have been developed to hold parts securely and accurately, loading only one part at a time often severely limits machine and operator efficiency.

Perhaps one of the significant problems that faced in this field is the fact that CNC machining is a relatively new field and though some work has been done in the field of fourth axis work holding, relatively little has been done in work holding in horizontal or vertical machining centers. In an effort to increase operator and machine efficiency, those in the field often secure multiple collets, vices, over center locking systems and a variety of other devices to the machining table to hold multiple parts. While this approach may provide some improvement, the loading and unloading of parts is usually done with the machine turned off and therefore limits efficiency for both the machine and for the operator.

A pallet system is sometimes used. Multiple holding devices are sometimes secured to two pallets in an identical manner allowing parts to be loaded on one pallet outside of the work environment while the parts on the other pallet are being machined. This method may improve efficiency to some degree but problems of efficiency remain. This method often requires manual tightening or releasing of multiple screws or other mechanical devices. This can be time consuming and inefficient for the operator. It can also lead to physical stress and carpal tunnel concerns which also negatively impact efficiency. On some jobs, the loading and unloading of the parts may take longer than the machine cycle time. The machine would then be waiting for the operator and therefore not operating as efficiently as possible. These holding devices can also tend to be oversized and bulky limiting the number of them that fit into the work area and thereby limiting the number of parts that can be loaded at a particular time. Change over from one part to another can also be time consuming.

In addition to these efficiency problems, this pallet approach can create other problems. When vices are used, accuracy may be hard to maintain due to inherent problems with vices. The security of the part may be an issue if the size of the part varies and you are holding more than one part; one or more parts may be loose when the others are tight. When custom jaws are used the cost may be high and accuracy can still be an issue with duplication for multiple holding devices and multiple pallets.

Attempts to solve problems in this field include U.S. Pat. No. 3,632,122. This device utilizes hydraulic pressure to clamp parts in collets and releases them when the pressure is removed. This invention solves some of the accuracy and security problems stated above. If two of these units were bolted to two pallets in a pallet system, many of the problems of efficiency stated above could be solved. One type of problem with this device, which is solved by the current invention, is the very limited scope of its application; it is very limited in the size and shape of the parts that it can hold, the angles at which it can hold them, and the number of parts it can hold at a time. From some perspectives, this device can hold a very limited diameter and shape of parts—only those parts that can be held in the particular collets built into the system (3C, 5C, etc.). The part may also need to be a certain length. If it is too long, the device may not work at all or quality may be negatively impacted. It is not fully adaptable for other applications such as clamping by pushing, pulling for sideways movement, clamping in "V" blocks, or many other methods of holding. This device is also very limited when holding parts in the horizontal plane and doing cross work because of the distance from the top of the fixture to the centerline of the collet. This distance can require excessively long tooling or extension of the part a significant distance from the collet, either of which may impact rigidity and accuracy. In some situations, the bottom row cannot be accessed to do cross work because the top row is in the way. This can significantly limit the number of parts that can be machined per cycle. The device can also be limited to holding parts vertically or horizontally and may not be efficiently machined in other planes.

In an effort to overcome some of these limitations, some people create custom fixtures to hold the parts they manufacture. They utilize collets, vices, over center clamping and a variety of other devices. More recently, modular hydraulic devices have become available to automate the clamping and unclamping. This approach does solve some of the problems but it may also create problems. One problem is the time required to create custom holding devices. The excessive time required often does not meet the demands of a quick response marketplace. The manufacturer is therefore often faced with the choice of inefficient and expensive setup or inefficient and expensive run time. Another problem is that run efficiency can be rather limited. Custom fixtures are usually bulky limiting the number of parts that will fit in the work area and therefore the number that can be loaded at a time. Self-made fixtures also tend to be inaccurate affecting quality and also creating inefficiencies. Many fixtures use mechanical clamping which can mean tightening screws or over center clamps. This can be time consuming and labor intensive. Efficiencies are also lost due to operator fatigue. In addition, often the parts are not held securely creating quality, rework and safety issues. Screws, which are often used in holding parts, can tend to mar the part or collapse a thin walled part affecting quality and therefore affecting efficiencies. Unless two identical fixtures are made, the parts can need to be loaded and unloaded in the work area so the load time can be slow and labor intensive and therefore machine down time can be lengthy. When two identical fixtures are made and one scrapped out, you often need to make both over again to get the precision needed. Sometimes the design doesn't work as planned. The initial cost of custom fixture making can be high because it can require significant amounts of time from highly skilled design personnel. It can also require expensive materials and services since the materials are usually purchased in small quantities and the special services are preformed in small quantities (heat treating, anodizing, grinding, etc.). The on-going costs can also be high. As mentioned, fixtures are often designed and built for a specific part. When a new fixture is desired for a different part it can become necessary to start over again. Fixtures may tend to become similar but are often not interchangeable; they are not easily adaptable to other parts. They often become obsolete because of minor print changes or need major rework. The cost of starting over is, of course, very high. The inventory of fixtures can become extensive, taking up large amounts of shelf space. They can be expensive to maintain especially if they are lost and damaged.

As to both the application to the CNC machining center and to machining in general, the present invention discloses techniques that overcome virtually every one of the previous problems in a practical fashion. It provides to the manufacturing industry the opportunity to significantly improve both setup and run time efficiencies, reduce operator fatigue and carpel tunnel concerns, and maintain or improve quality and safety.

DISCLOSURE OF INVENTION

The present invention includes a variety of aspects, which may be selected in different combinations based upon the particular application or needs to be addressed. In one basic form, the inventions provide a pallet or a palletized system, that is a removable or detachable spatially fixed configuration for a work holder system. The part of the system serving as a lower pallet may be configured perhaps as one embodiment as a hydraulic plate that may contain multiple bidirectional hydraulic cylinders (80, for example) that are contained within the hydraulic plate and can be plumbed internally. A variety of top plates can be easily attached/detached to a hydraulic plate or other movement mechanism. It can later be removed or detached and replaced with a different top plate. The top plate may have a variety of holding devices attached to it that are mechanically linked to the hydraulic cylinders in the hydraulic plate. In one embodiment, these three objects, the hydraulic plate, the detachable top plate and the holding devices, can together form a hydraulic pallet. The preferred system could even include two identical hydraulic pallets. One pallet could be secured to the machining table where the parts could be machined while the other pallet is on an exchange table where the parts could be unloaded and new parts loaded. The pallets could then be exchanged starting the process again. When the hydraulic pallet is on the exchange table it could be attached to peripheral hydraulic components allowing for the plate to release the hydraulic pressure that could release the parts and then apply pressure to lock the new parts in place.

One of the broad goals of the invention is to provide a work holding system that can have the capability of holding most any part securely, carefully and accurately. Thus, one goal is that the invention will securely hold the parts to be machined. When holding multiple parts, the hydraulic pressure can compensate for tolerance ranges on the holding dimension since each position can be actuated independently. The hydraulic pressure can be adjusted to provide appropriate pressure to hold the part securely. Another goal is that the part may be held carefully so as not to damage it in any way. The ability to adjust the hydraulic pressure again provides a means to accomplish this goal. Another goal of the invention is that all of the parts can be held with appropriate accuracy. The system can provide for accurately assuring repeatedly precise positioning of the pallet by using attachment elements which may have a fixed relationship to the detachable workholder web type of pallet. The system can also provide for accomplishing a single positioning operation for placing or even removing the detachable workholder web. Through this design, the system may provide for accurate locating of the holding devices to the top plate, the top plates to the hydraulic plates, and the hydraulic plate to the machining table. The system can also allow for V blocks or other devices to be machined after being attached to the hydraulic pallet and loaded on a particular machine, thereby compensating for the irregularities of that machine. It may provide for detachably positioning the pallet element with little risk of misalignment.

Another broad goal of the system is to accommodate clamping one or large numbers (even 200 plus) of parts at a time. One aspect of the invention holding system is that it can provide the means to hold just one part at a time. On the other end of the spectrum the invention can provide for holding a large number of parts. These may be identical parts, families of parts, or a variety of different parts.

Another broad goal of the invention's system is to allow for the ease, efficiency and safety of loading and unloading parts outside of the work environment. It is a goal of the system to diminish operator fatigue by allowing the operator to load and unload the parts from a pallet outside of the work environment avoiding the fatigue such as caused by leaning into the machine to load and unload parts. Another goal of the invention is to increase efficiencies by allowing for one of the pallets to be loaded off site while the parts on another pallet are being machined and then quickly rotating the pallets thus minimizing down time between cycles. Depending on the length of cycle time per unit, the operator may be available to perform other duties. Another object of the invention's system is to provide greater safety for the operator by keeping him/her out of harms way from the machine being accidentally started, thus reducing possible injury. Similarly, a goal of the invention's system is to protect the operator from the environment of cutting fluids sprayed inside of the machine or the like by minimizing the time that the operator is in the work environment.

Another broad goal of the invention's system is to improve operator efficiency by providing for the simultaneous, automatic clamping and releasing of all parts if desired. One goal of the system can be to improve the efficiency of the operator by providing automatic and nearly instantaneous locking and unlocking of the parts. A further goal of the invention can be the ability to lock or release parts easily, allowing the invention's system to do the more strenuous work of clamping or holding the work piece securely or releasing it completely allowing for easy removal. A related goal of the system can be to eliminate the problem of carpel tunnel that can be caused by the repetitive mechanical clamping and unclamping of parts on a pallet. A related goal of the system can be to improve operator efficiency by preventing the holding device from sticking by providing a positive and suitable force to release the holding mechanisms.

Another broad goal of the inventions can be to accommodate multiple methods of holding which is suitable to most any part. One goal of the invention can be its adaptability to different sizes, shapes and quantities of parts. A related goal of the invention is that parts may be held by, but not limited to, pushing or pulling, clamping, expanding, or contracting. Still another goal of the invention's system can be that it may clamp or hold parts externally. By holding the outside of the part, the inside or a desired surface of the part can be accessible for machining. In keeping with the prior goal of the invention's system, it may also clamp or hold parts internally allowing machining on the outside or desired surface of the part. Yet another goal of the invention's system can be that it will hold parts, but is not limited to, in an all vertical or all horizontal positions or it may be a combination of both or any position. Another goal of the inventions systems can be that is has the capability of holding parts by means of a sideways motion, swing motion, turning motion, teetering motion, over center motion, lever motioning, pushing motion, pulling motion, or any other motions.

Another broad goal of the invention can be to provide for quick setup changeover from one type of part to another. One goal of the invention system can be that it may allow for multiple parts to be set up on the pallets at a time allowing for nearly instantaneous changeover from one part to another. Another similar goal can be that since different types of parts may be held or clamped on the same pallet and share tooling, one work center can supply multiple production cells with parts as needed. Yet another goal of the invention is quick changeover to a previously run part. The operator may set the tooling for a given part to a fixed datum point and document the tooling requirements. When at a later time the part is to be set up again, since the part's position has been previously established, setup time can be minimized. Yet another goal of the system can be that with its modular holding devices a new part can be set up in minimum time. Another broad goal of the system can be to keep the pallet independent of the hydraulic power pack while it is in the work environment, thus making the system more efficient and economical. A goal of the system can be to be able to charge the hydraulic plate with the hydraulic power pack while it is outside of the work environment and then disconnect it from the power pack allowing for easier and faster removal and exchange of the two pallets. A related goal can be to minimize wear and tear on the hydraulic power pack and the hydraulic lines by keeping them out of the work environment.

Another broad goal of the system can be that it may allow a person with only average skill to set up complex holding systems due to the modular holding devices. Another broad goal of the system can be that it may allow for developing custom holding fixtures quickly and efficiently. The power to operate custom holding devices and the means to locate and fasten the device may be integral to the system and therefore much of the work necessary in developing custom fixture is already done.

One of the broadest objects of the invention can be to provide a complete system for work holding; it can provide a work holding system that will have the capability of holding most any part securely, carefully and accurately; and it may accommodate clamping one or large numbers of parts; it may provide the opportunity to load and unload parts outside of the work environment; it may provide simultaneous, automatic clamping of all parts; it may accommodate multiple methods of holding suitable to most any part; it may provide for quick setup changeover from one type of part to another; and it may allow for developing custom fixture holding quickly and efficiently. While some of these individual goals have obviously been achieved in other manners, a goal of the present invention is to achieve them all in one system and thereby provide the opportunity for much greater utility and efficiency.

MODES FOR CARRYING OUT THE INVENTION

Figure 1:
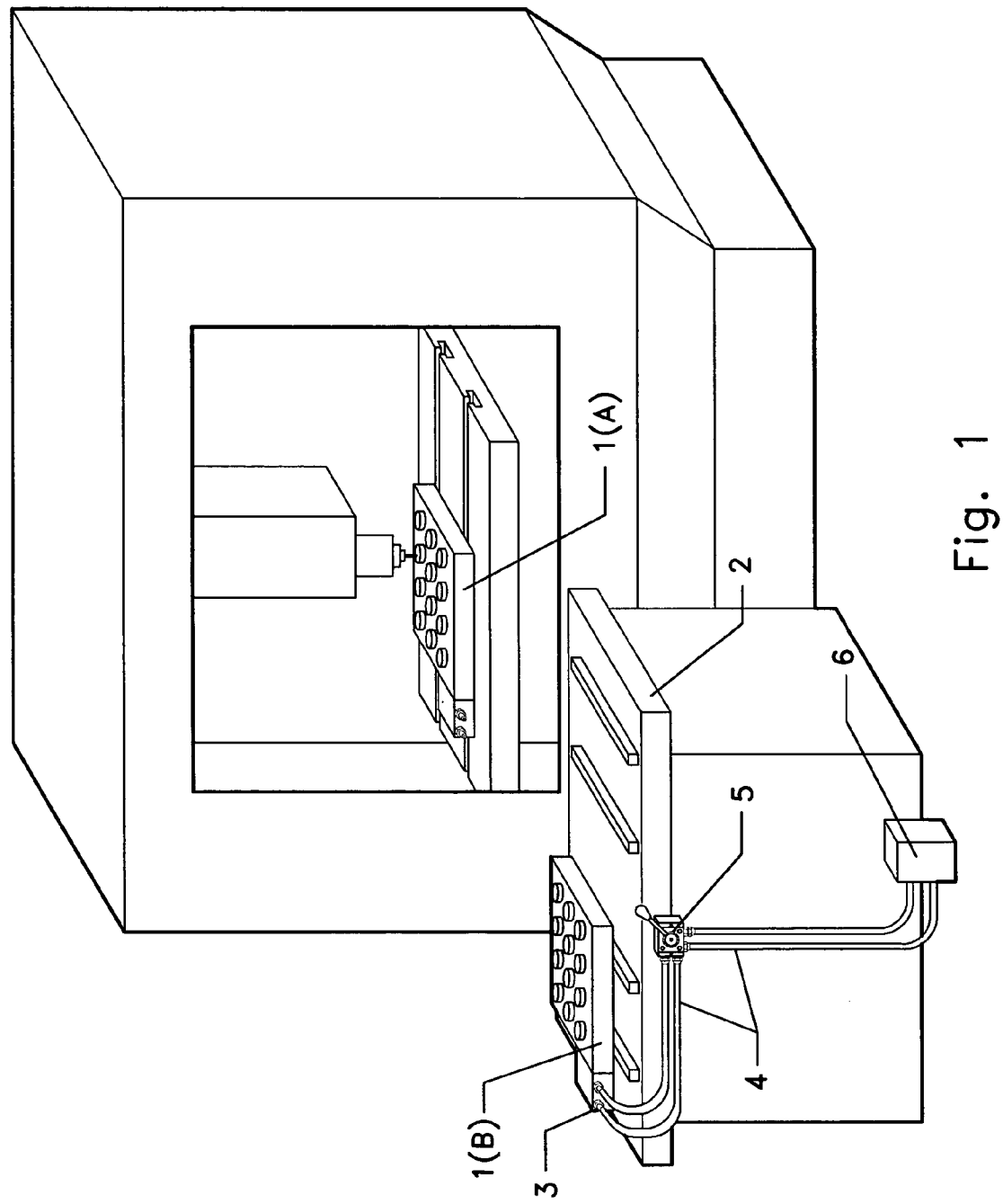
FIG. 1 is a drawing of one embodiment of the hydraulic holding system in a machining center with one pallet loaded with parts in the machining environment and another pallet on the transfer table.

As mentioned above and as can be seen from the drawings, the present invention is a work holding system that may be embodied in many different forms to meet specific work holding requirements.

The main components of a preferred embodiment of the system may include two hydraulic pallets and peripheral hydraulic components. In this embodiment the source of power to accomplish the desired results is applied through a hydraulic system or a hydraulic power source. Thus, in this embodiment and the following discussion, the system achieves a method which involves the step of hydraulically powering the appropriate devices. Naturally other power sources should be understood as possible, including but not limited to an electric power source so that the system achieves a method which involves the step of electrically powering the appropriate devices.

FIG. 1 illustrates the hydraulic embodiment and one type of components and how they may be used in a machining center. In this illustration, one hydraulic pallet (1(A)) may be locked to a pallet receiver on the table of a machining center that is full of parts that are hydraulically locked in place and are ready to be machined. A second hydraulic pallet (1(B)) is shown on the transfer table (2) (or more generally, a separate detachable workholder web coordinated transfer element) and may be connected by means of quick disconnects (3) and hoses (4) to a remote mounted control valve (5) and hydraulic power pack or power source (6), more generically a power source. In this configuration the operator could start the machine working on the parts on the machining center table and release, unload, reload and lock the parts on the pallet on the transfer table. To release the parts on the transfer table the operator could connect the hydraulic quick disconnects (3) and position the remote mounted control valve (5) in the appropriate position. This could both relieve the hydraulic pressure holding the parts in place and provide positive hydraulic pressure to open the holding device preventing the device from sticking in the closed position. The parts could then be quickly and easily unloaded and new parts loaded onto the pallet. The new parts could then be locked in place by properly positioning the remote mounted control valve causing positive hydraulic pressure to lock each part in place. The hydraulic hoses could then be removed and the parts could remain locked. When the machining is done, the two pallets could then be exchanged starting the entire process again.

Figure 2:
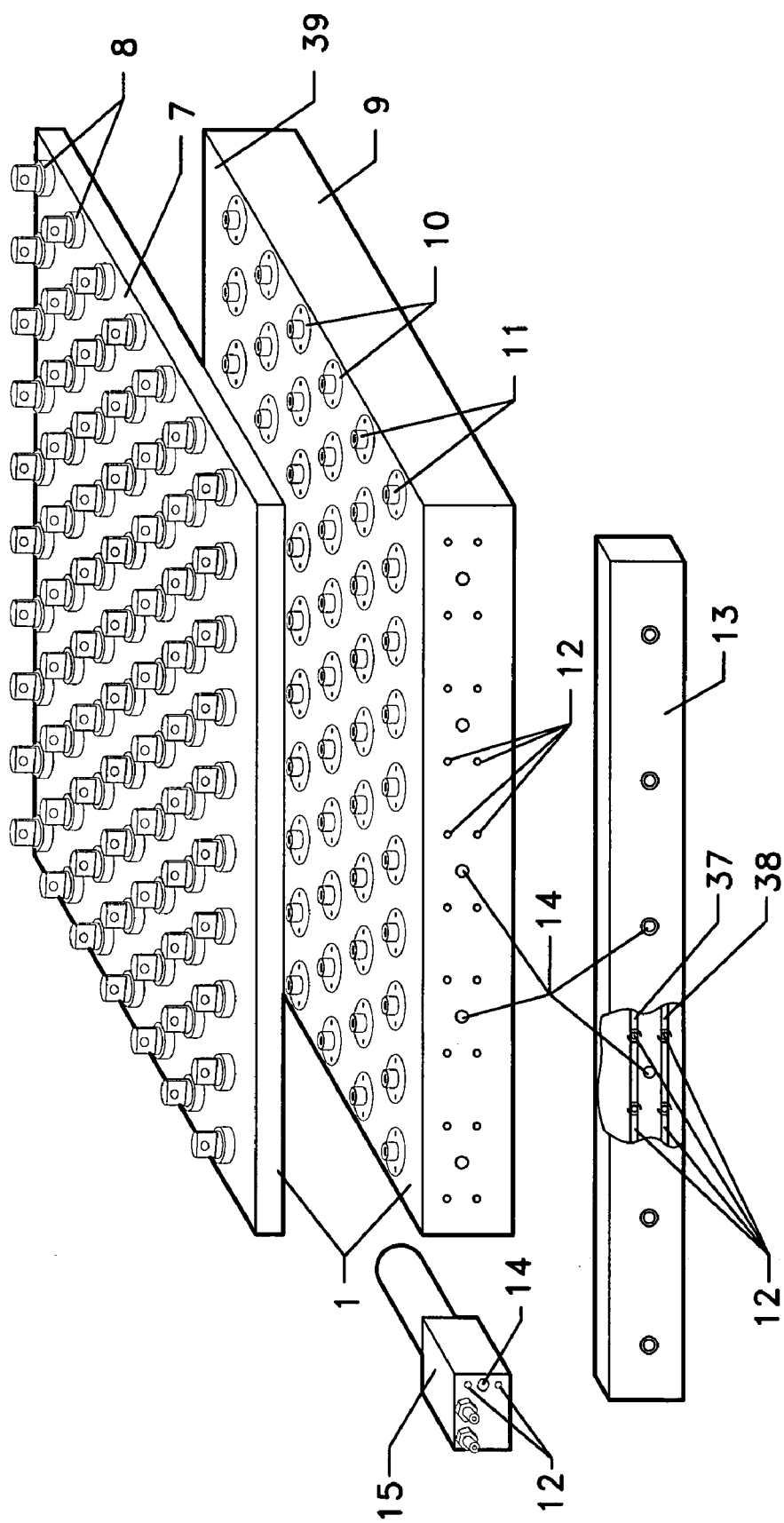
FIG. 2 is an exploded view of one embodiment of the top plate, hydraulic plate, manifold and accessory block.
Figure 4:
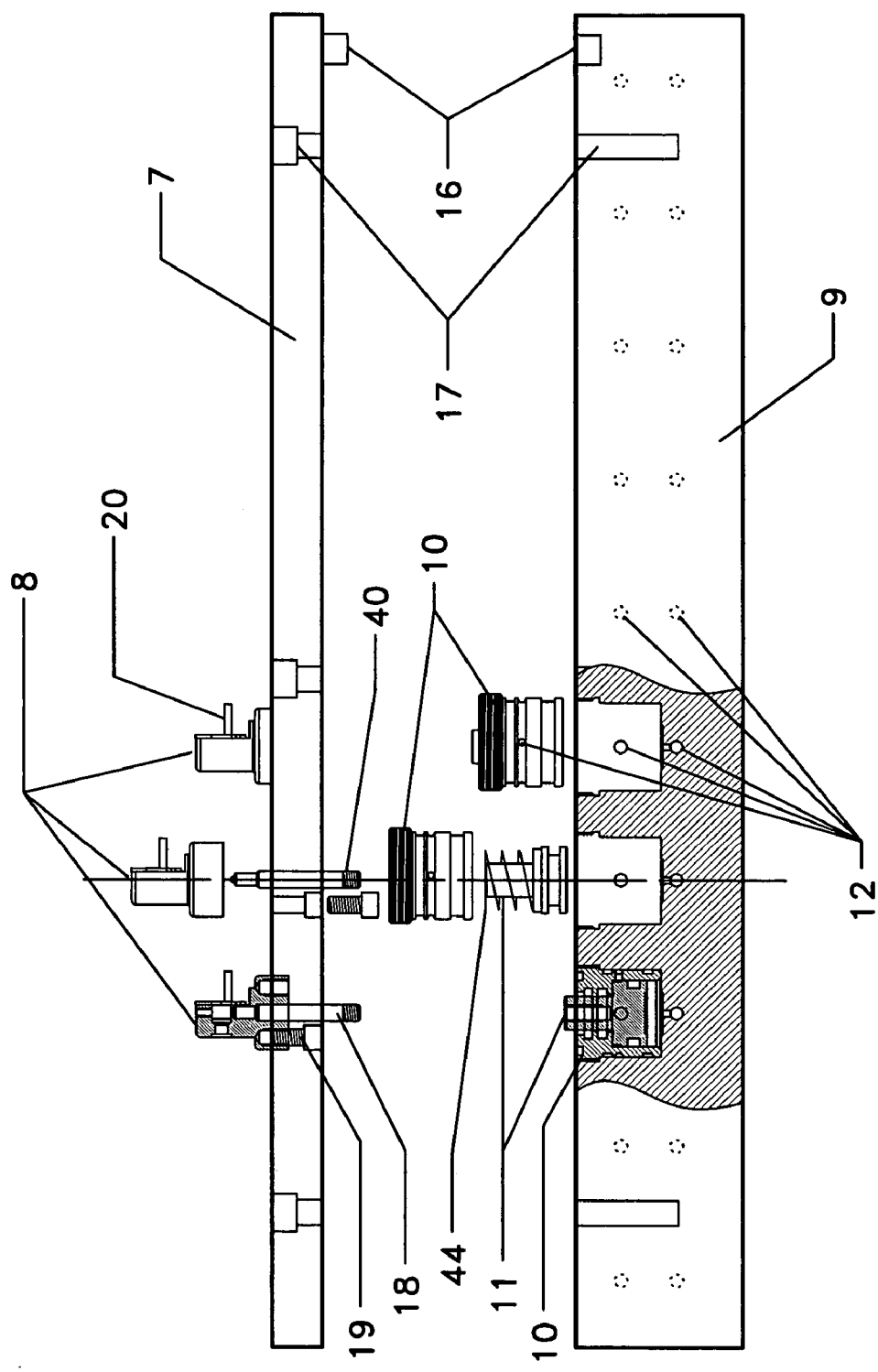
FIG. 4 is an exploded side view of one embodiment of the two plates showing the component parts of the hydraulic plate and their relationship to the top plate and its components.

In general, the hydraulic pallet may serve as a topographically fixed movement web (39) which is responsive to some source of power. As such, the web may provide fixed locations at which movement may occur or be generated. It may be configured as a multi-site movement web and may even be configured as a movement site matrix which is largely a rectilinear layout. In this design, the hydraulic pallet may have three main components as can be seen in FIGS. 2 & 4: a hydraulic plate (9), a detachable top plate (7) and holding devices (8).

The hydraulic plate may have internal components, a bolt on manifold (13) and a bolt on accessory block (15), all perhaps held by mount connections (14). Designs may thus serve as an integral power delivery web such that powering of a plurality of movement mechanisms integral to the web may be accomplished. By fluidly connecting a plurality of movement mechanisms, perhaps through a fluid connection element such as the fluid paths (12) or (37 & 38), an interconnected fluid path may be used to simplify the overall system. As shown this may be accomplished through a fluid manifold, such as the hydraulic fluid manifold shown. There may also be established an interconnecting of a multitude of fluid paths for several separate actions, of course.

By establishing at least two independent fluid manifolds, or perhaps at least two independent fluid paths, separate movements can be accomplished. As shown, this may be by interconnecting a first fluid path (37) and interconnecting a second fluid path (38). Each of these may be as simple as two opposite direction fluid manifolds (e.g., clamp and unclamp).

The internal components can include any type of movement mechanisms. As mentioned, these may be fixed relative to a topographically fixed movement web. These movement mechanisms can actuate the workholder devices as may be contained on a detachable workholder web such as the top plate (7). These movement mechanisms may also be bi-directional movement mechanisms, such as bi-directional hydraulic movement mechanisms. As but one example, the figures show the movement mechanisms as hydraulic cylinders (10) and also bi-directional hydraulic pistons (11) and porting (12) or a fluid path. As can be seen in the FIG. 4, hydraulic pressure can be directed to enter the cylinder above or below the piston driving it in the desired direction. This may be accomplished through a first and a second fluid path (37 & 38) as shown. The hydraulic pressure can be plumbed to the cylinders through ports in the hydraulic plate (12).

Figure 3:
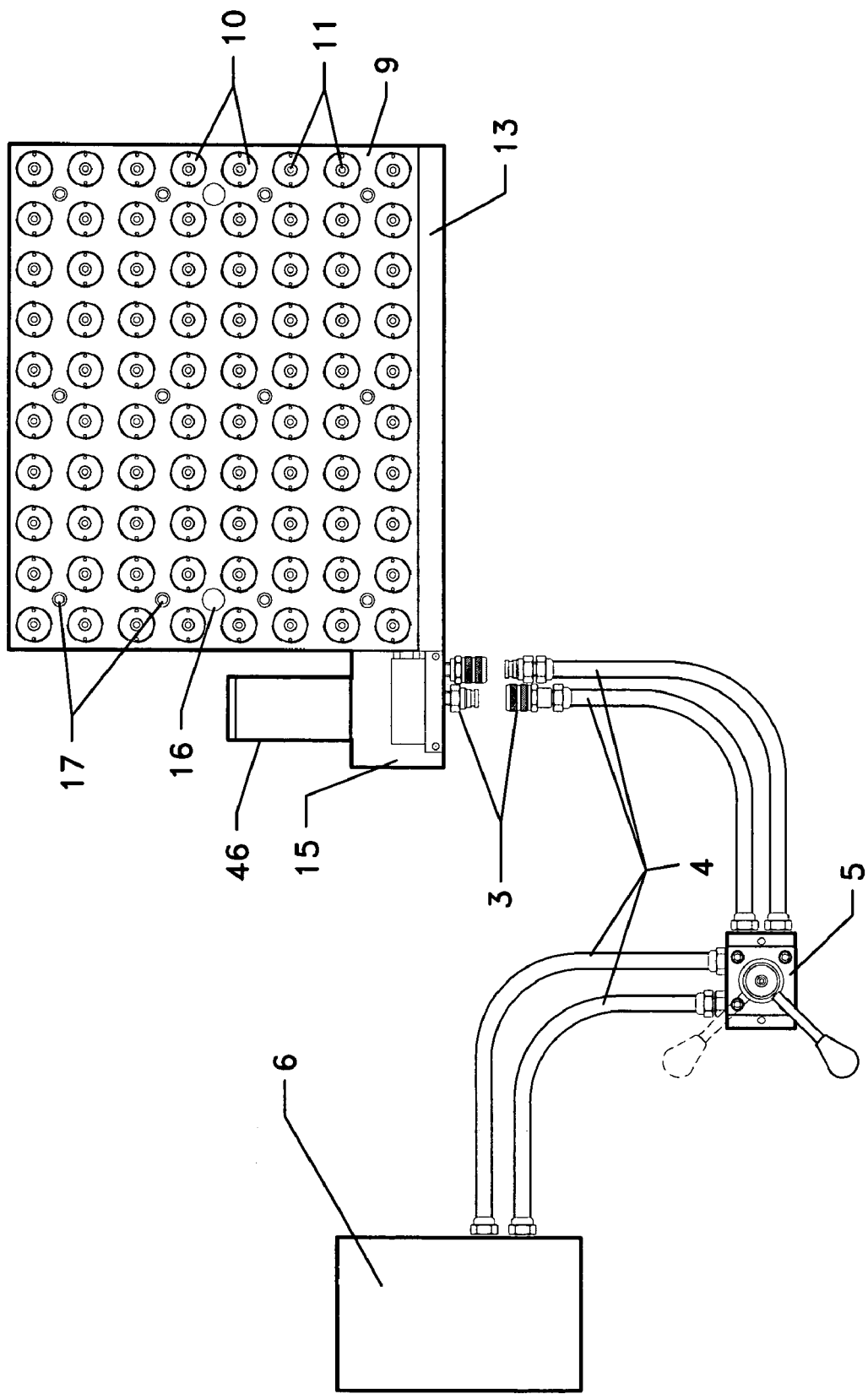
FIG. 3 is a top view of one embodiment of the hydraulic plate and the main hydraulic components.

FIGS. 2 & 3 show a hydraulic manifold (13) that ports the fluid from the accessory block (15) through the manifold to the hydraulic plate (9) to the hydraulic cylinders (10). In this embodiment the manifold is bolted on to the pallet but could be machined into the pallet itself as well. FIGS. 2 & 3 show the accessory block (15) attached to the hydraulic plate. The accessory block can receive hydraulic fluid through a quick disconnect (3), and can route the fluid through the accessory block components (explained below). The fluid may exit the accessory block into the manifold (13) may pass through the hydraulic plate ports to the cylinders, may return through the ports to the manifold, through the manifold to the accessory block and to the other quick disconnect.

Figure 5:
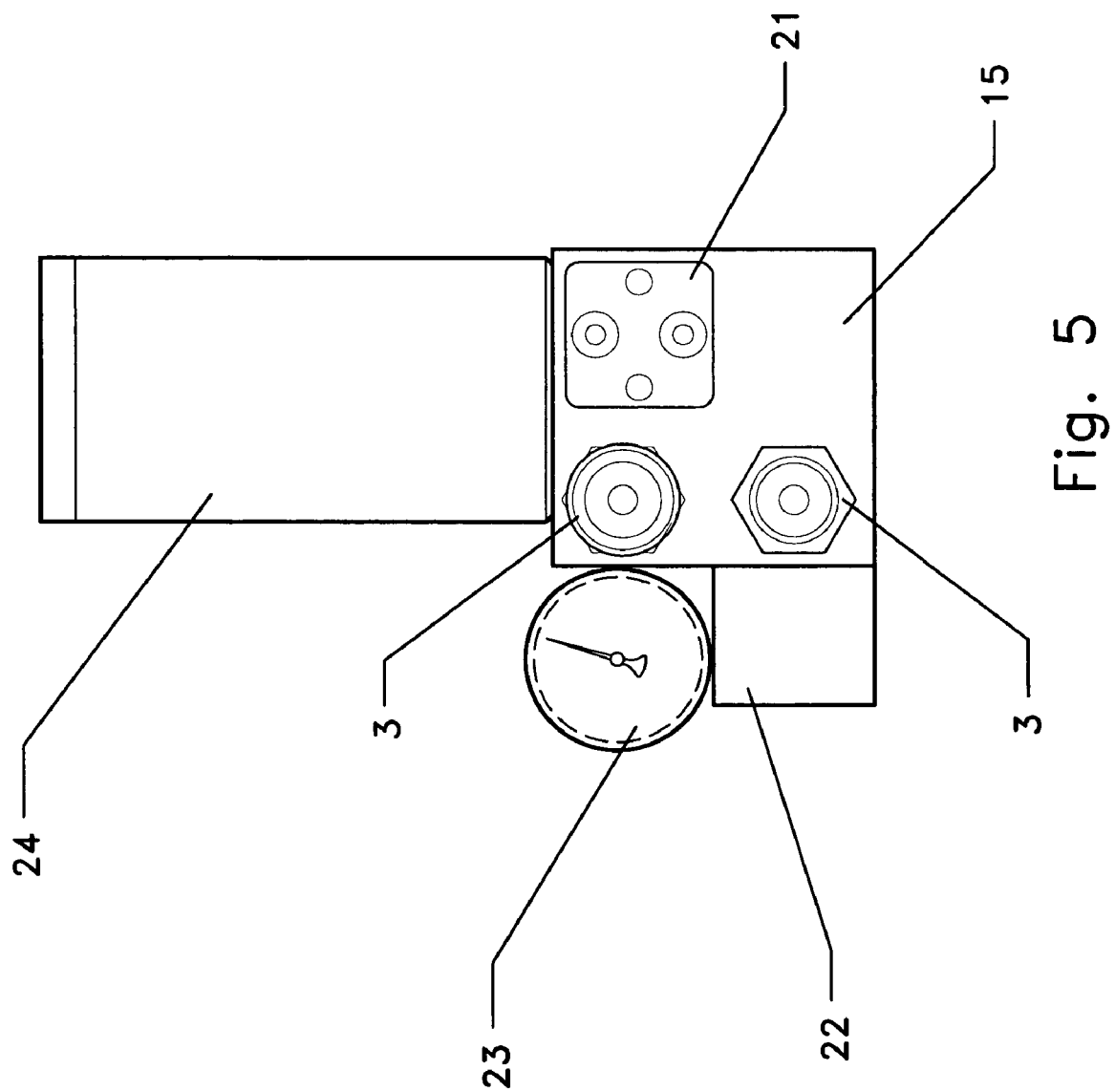
FIG. 5 is a drawing of one embodiment of the accessory block with its component parts.

FIG. 5 shows the components of an accessory block which includes one type of resettable direction element. It may be simply a removable element, a removable block, or even a removable piston linkage. As shown, the reversing block (21) can be a removable/exchangeable block that can determine the direction of the hydraulic flow. One block can direct the fluid in one direction and the other block in the opposite direction. Reversing the flow can allow the accumulator and pilot operated check valve to push and hold the piston in an appropriate direction to lock the holding device by either pushing or alternately by pulling or otherwise—depending on the design of the holding device. This could also be accomplished with a reversing valve or other reversing device. A position lock element (46) including items such as a check valve, perhaps the pilot operated check valve (22) can provide a hydraulic lock that, along with the accumulator, keeps the parts locked in place on the pallet after the hydraulic power pack has been disconnected. This can serve to retain one or more of the workholder devices in a locked position even after the pallet has been removed from the movement web and positioned remote to it. To assure that the locked position is maintained, an embodiment can include a pressure monitor. The pressure gage (23) can provide a means for monitoring the pressure in the system to confirm that pressure remains adequate to securely hold the parts while being machined. This gage could be replaced or supplemented with a pressure flag or light if desired. The accumulator (24) can provide a reserve of hydraulic pressure that, along with the pilot operated check valve, can keep the parts locked in place on the pallet after the hydraulic power pack has been disconnected. Thus the system may include a hydraulic hold element. The quick disconnects (3) can provide a quick and easy way to connect and disconnect the hydraulic lines from the hydraulic plate. Such a quick disconnect coupling, perhaps a hydraulic quick disconnect coupling for a hydraulic embodiment, can permit faster change out of the pallet(s).

Figure 6:
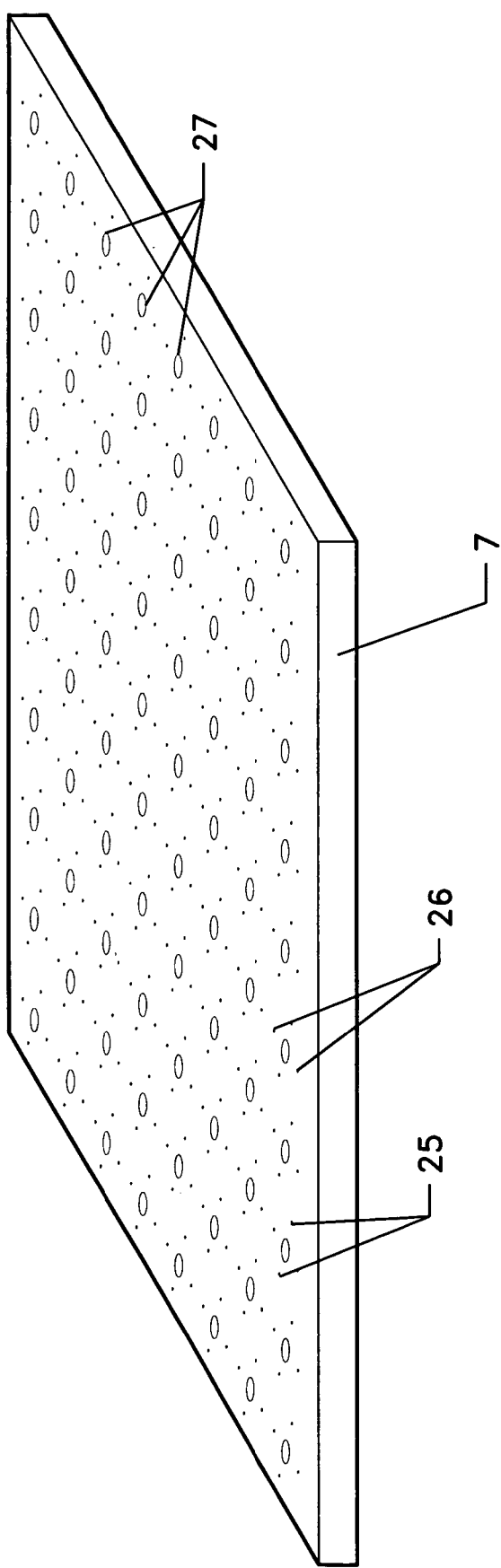
FIG. 6 is a drawing of one embodiment of a modular top plate that allows for securing a wide variety of holding devices.
Figure 7:
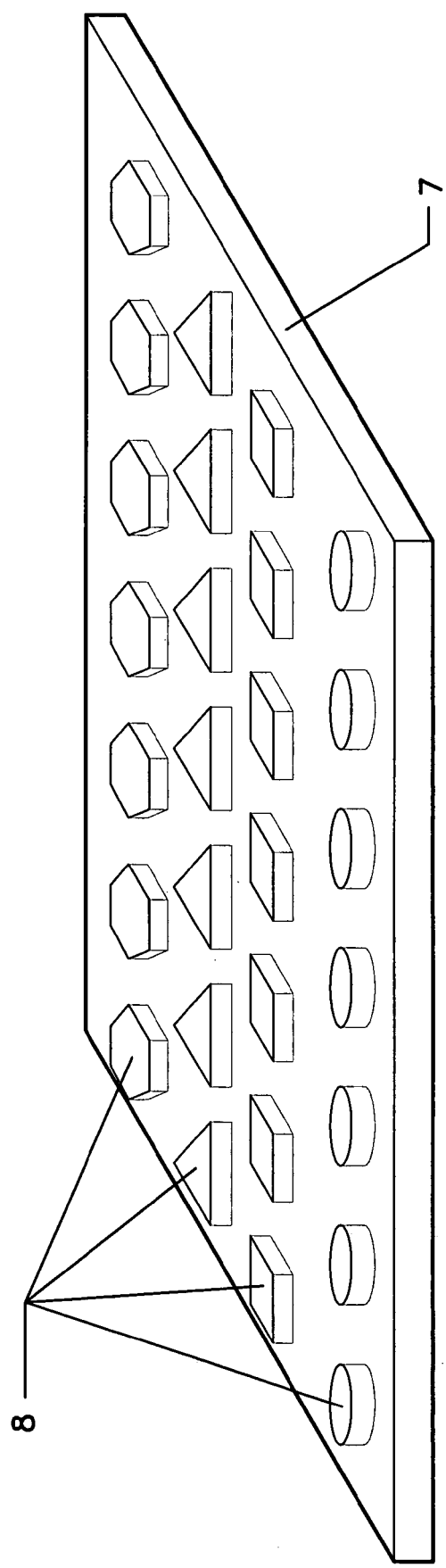
FIG. 7 is a drawing of one embodiment of a top plate (custom or modular) mounted with various holding devices.

A second main component of the hydraulic pallet is the detachable top plate. In general, the detachable top plate may serve as a detachable workholder web which may be responsive to the movement mechanisms responsive to the movement web. As shown in FIGS. 2 and 4 a top plate (7) can be attached to the hydraulic plate (9) and can provide a base for mounting the holding devices. Precision location holes (FIG. 4, #17) and pins (16) can provide accurate location between the hydraulic plate and the top plate and can provide for efficient attachment, removal and reattachment of another top plate to the hydraulic plate. As such they can serve as one type of topographically fixed location element to which both the topographically fixed movement web and the detachable workholder web can be responsive. FIG. 4 also illustrates a piston linkage (18) that can either connect the piston to the holding device or be removed allowing the piston to move up or down within the hydraulic plate but not interfere with the top plate or any device on the top plate. The top plate can be either a modular top plate or a custom top plate. It may be a workholder device site matrix, a custom workholder device site web, or a custom workholder device site web coordinated with an underlying site matrix. The modular top plate (shown in FIG. 6) can be a plate machined to provide maximum flexibility and quick change over of various holding devices. The modular top plate can provide: threaded holes (25) for attaching holding devices; location holes (26) for accurate location of holding devices, access holes (27) for the piston linkages (18) to all of the pistons (11). Custom top plates can be developed either by the manufacturer or by the consumer to meet specific requirements (see, for example, FIGS. 7, 8 and 9). Each custom top plate can provide the precision location holes, pins, or attachment methods (as mentioned above) to provide accurate location between the hydraulic plate and the top plate. The top of the custom top plate can be developed as necessary to meet the specific custom needs even in not all movement mechanisms are used. This can differ from the modular top plate in that it may only have the holes required for a particular application and therefore may provide for locating custom holding devices and/or fixturing at the specific location required. It can also provide a very clean surface that helps in chip removal.

As shown, it may be desirable for the top plate to be a movement web-coordinated detachable workholder web so that it is coordinated with the lower plate. As mentioned it may be a substantially 1:1 movement web-coordinated detachable workholder web or not. There, of course, may be a substantially 1:1 movement mechanism-coordinated plurality of workholder devices. By coordinating the detachable workholder web and the topographically fixed movement web, efficiency can be achieved.

Figure 10:
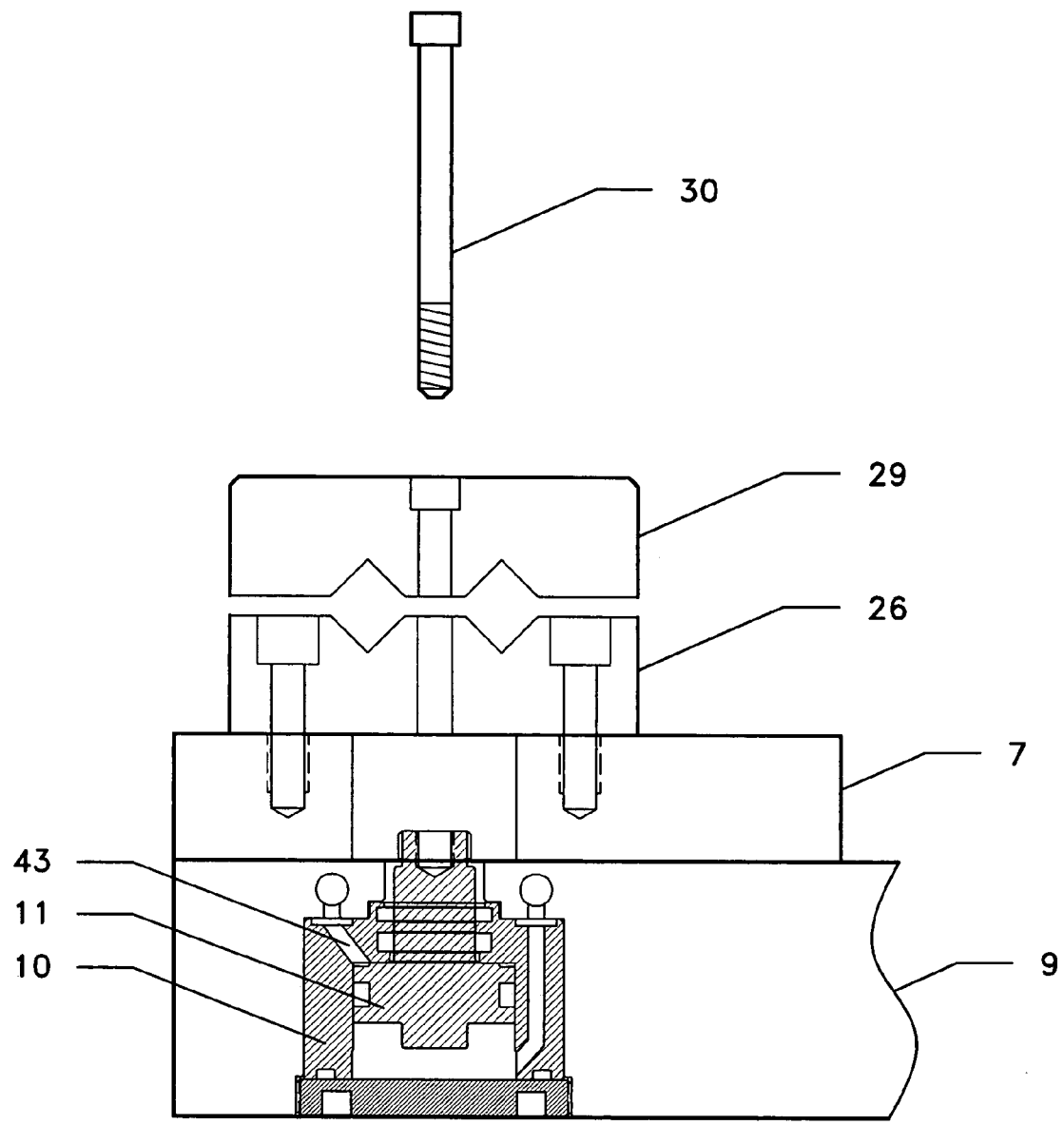
FIG. 10 is a drawing of one embodiment of a modular V block attached to a modular top plate and also shows its relationship to the components of the hydraulic plate.

A third main component of the hydraulic pallet is the holding device. The modular top plate can be designed to accommodate accurate and efficient attachment and replacement of a variety of holding devices or workholder devices. These may be attached to the detachable workholder web so they can retain at least one item in a fixed position relative to the detachable workholder web. The workholder devices may be responsive to attachment elements (40) (either positively or responsive in some fashion) and, of course at least one of the movement mechanisms. As one example, FIG. 10 is an illustration of a modular V block module that can be attached to the modular top plate (7) and can accommodate (in this embodiment of 80 cylinders) 160 parts. The base of the V block can be bolted to the top plate and the V block top (29) can be pulled down by the piston linkage bolt (30) that can be attached to the piston (11) that is in the hydraulic plate (9). FIGS. 11, 12, 13 & 14 illustrate a modular collet system (U.S. patent application Ser. No. 09/326,343 hereby incorporated by reference by these same inventors) that can accommodate standard collets (3C, 5C, etc.) for holding parts vertically, horizontally, or in any other plane.

Many other types of workholder devices can be used. Identical workholder devices may be used as well as having at least some different workholder devices. All may also be attached by a uniform workholder device mount. The great variety of workholder devices can include, but not be limited to a collet, a strap, an edge device, a swing device, a V block, a custom clamp, a swing arm, an edge lock, an over center clamp, a modular collet housing, a collet housing, a crosshole module, a V block module, a 3C clamp device, and a 5C clamp device. They may also include a push device, a pull device, an expansion device, a contraction device, an external holder device, an internal holder device, vertical position holder device, a horizontal position holder device, a sideways motion device, a swing motion device, a turning motion device, a teetering motion device, an over center motion device, a lever motion device, a pushing motion device, and a pulling motion device.

Figure 11:
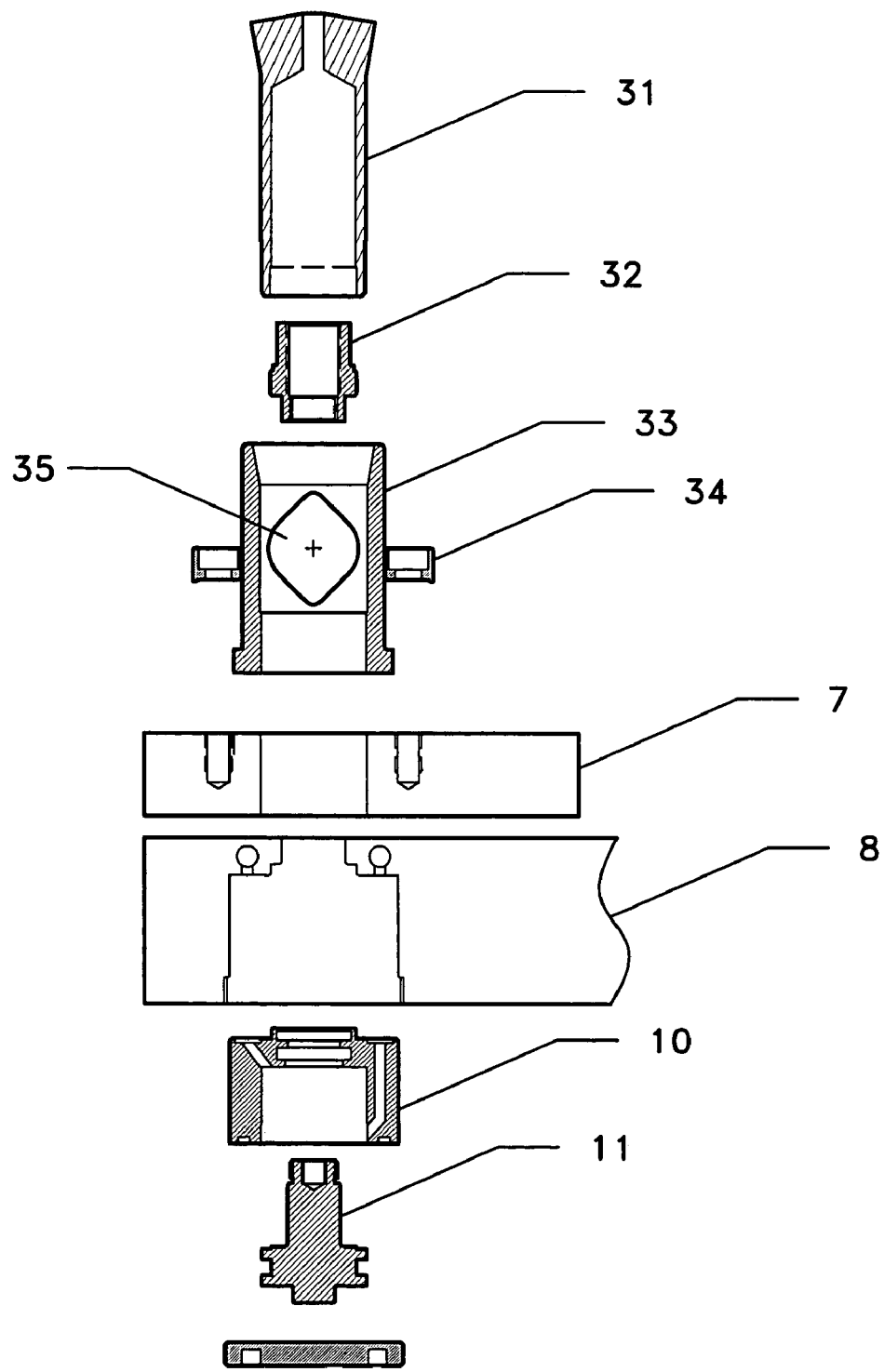
FIG. 11 is an exploded cross sectional view of one embodiment of a modular 3C/5C collet showing its component parts and their relationship to the component parts of the top plate and the hydraulic plate.
Figure 12:
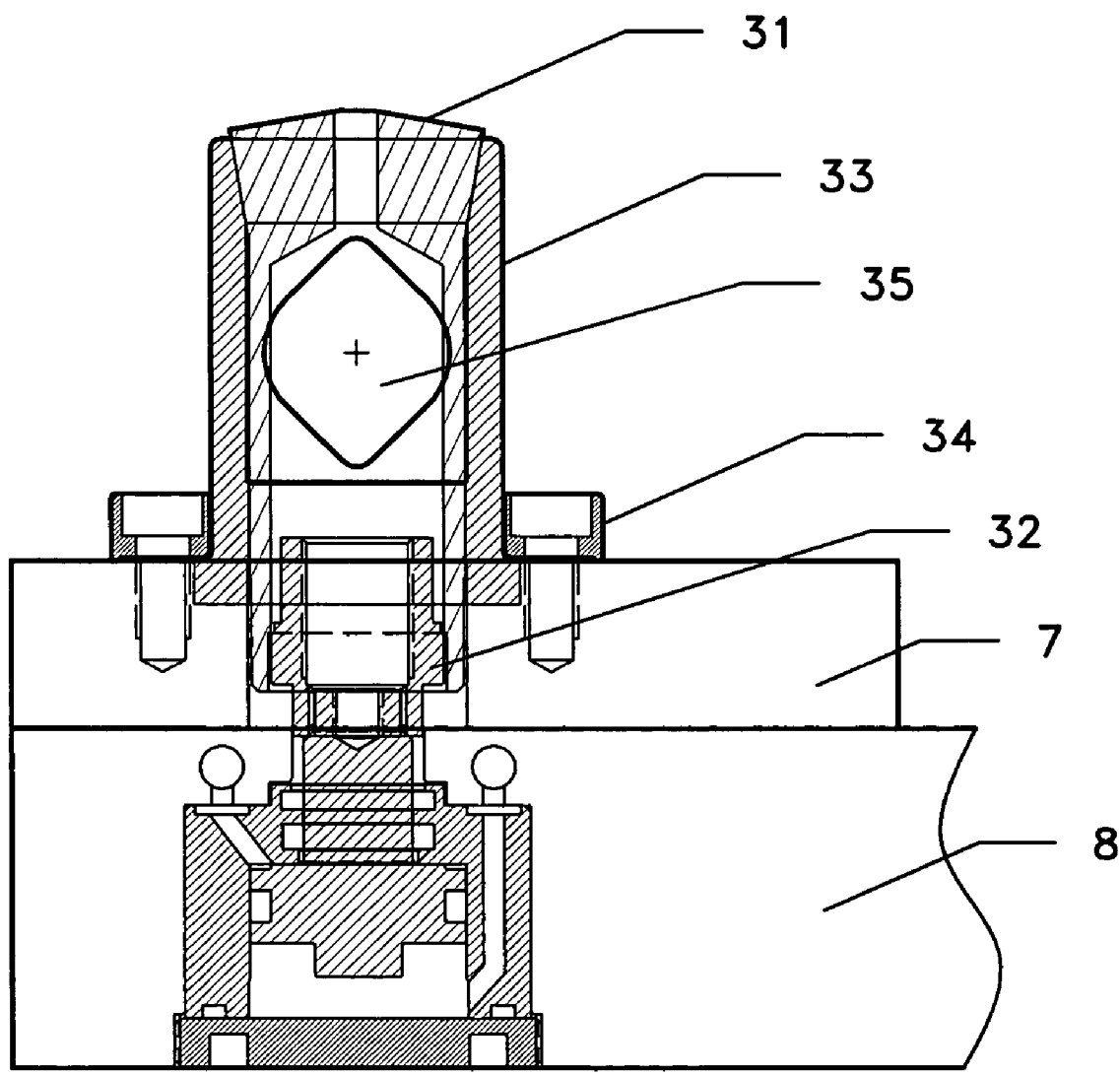
FIG. 12 is a drawing of an assembled cross sectional view of FIG. 11.

FIGS. 11 & 12 illustrate a vertical holding method. The collets (31) can be attached to the collet adapter linkage (32) that can be attached to the piston (11). The collet housing (33) can be attached to the modular top plate (7) by means of a collar lock (34) utilizing the bolt pattern and access holes of the modular top plate. In this embodiment (80 cylinders) 1 to 80 collets could be utilized at a time (the hole for cross hole clamping (35) is not used in this application).

Figure 13:
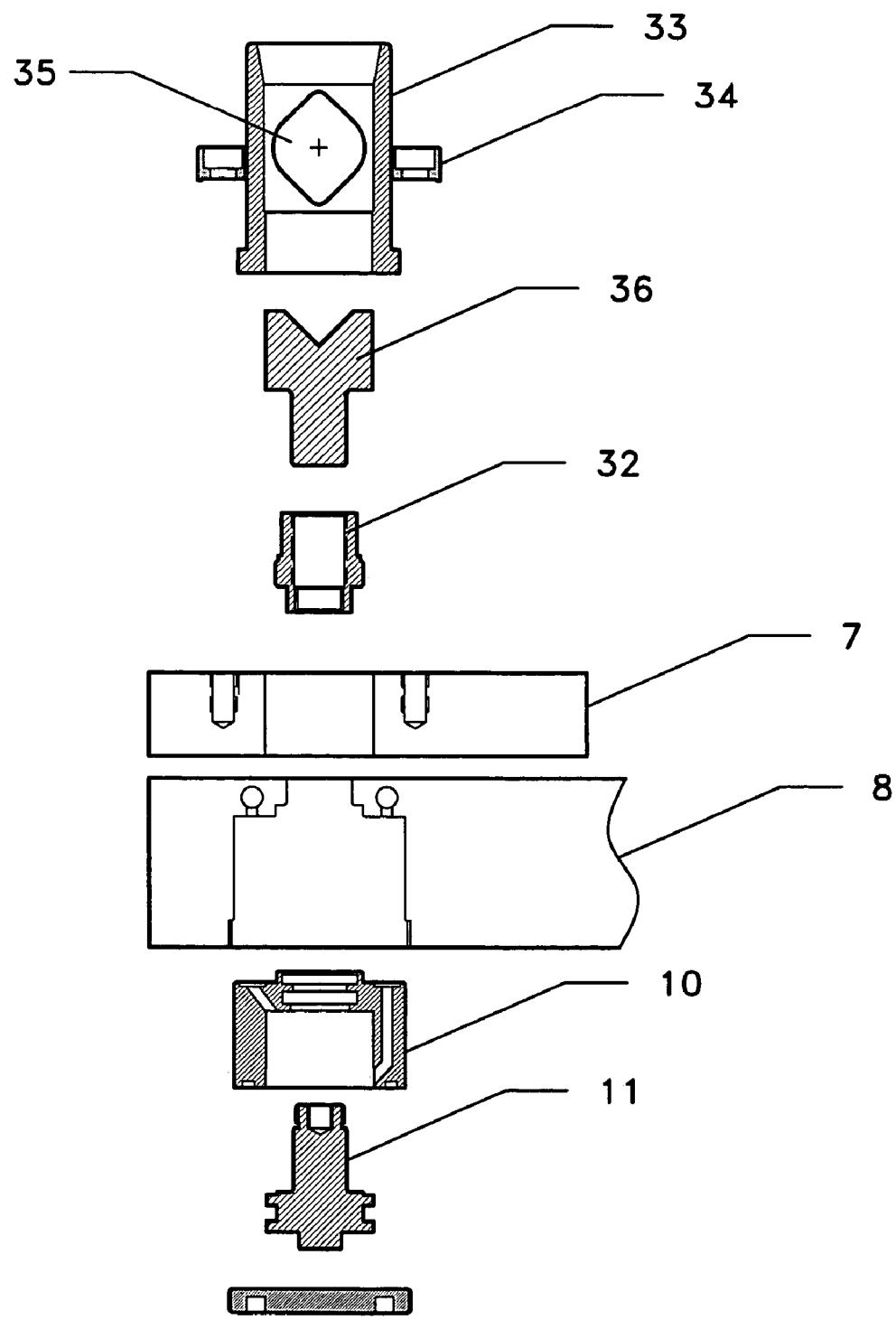
FIG. 13 is an exploded cross sectional view of one embodiment of a modular collet housing cross-hole holding device showing its component parts and their relationship to the component parts of the top plate and the hydraulic plate.
Figure 14:
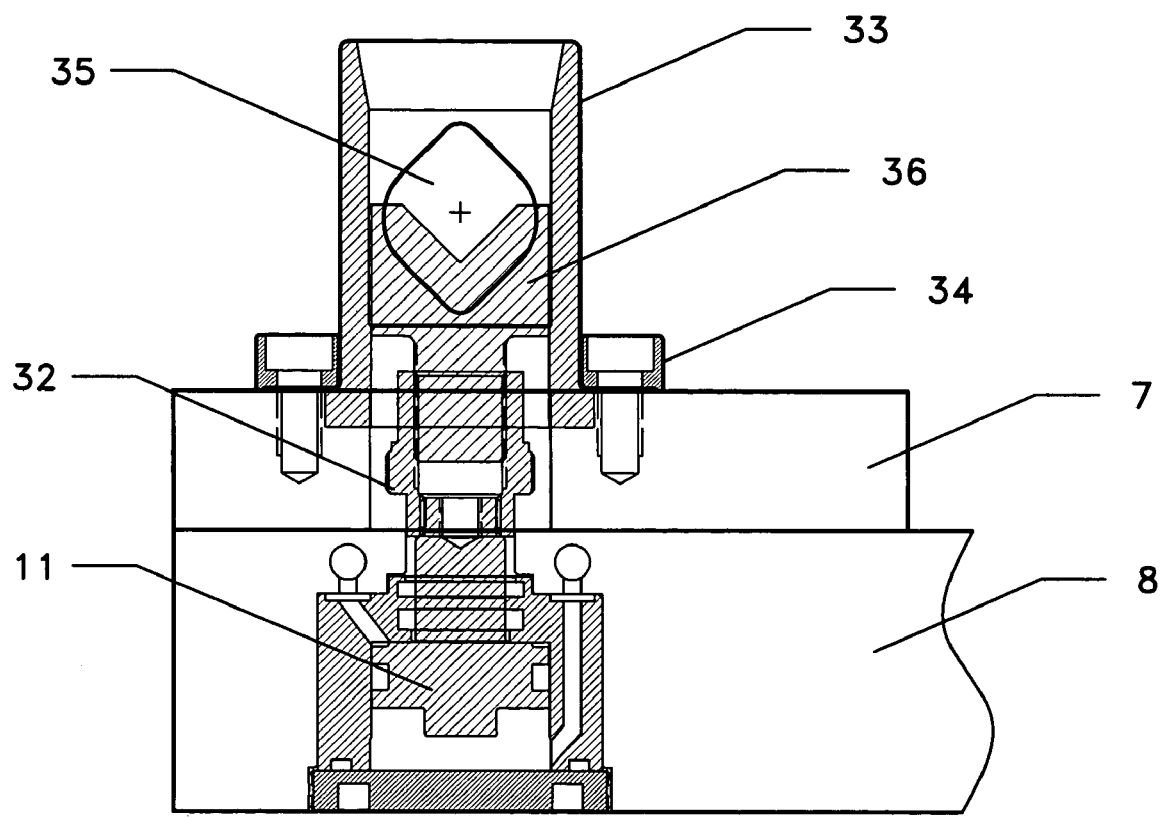
FIG. 14 is a drawing of an assembled cross sectional view of FIG. 13.

FIGS. 13 & 14 illustrate a horizontal holding method utilizing the same components as illustrated in FIGS. 11 & 12 except that the collet (31) is replaced with the cylindrical V stem (36). In this illustration the cylindrical V stem (36) can be attached to the collet adapter (32) that is attached to piston (11). This holding device could utilize the reversing block that could cause the hydraulic pressure to push the piston up and lock it up. After the parts that are to be machined are placed through the hole for cross hole clamping (35) in the collet housing, hydraulic pressure could be allowed to push the piston and the cylindrical V stem up until the part could come in contact with the top of the hole in the side of the collet housing (33) locking the parts in place ready for machining. The hole for cross hole clamping could be made at most any angle allowing for most holding in any plane from vertical to horizontal and virtually everything in between. Swing arm clamps, edge clamps, i.d. holding devices, o.d. holding devices, strap clamps and a variety of other devices can be attached either directly or through adapters to the modular top plate and connected to the piston linkage to provide a very comprehensive, flexible and efficient means of work holding.

Figure 8:
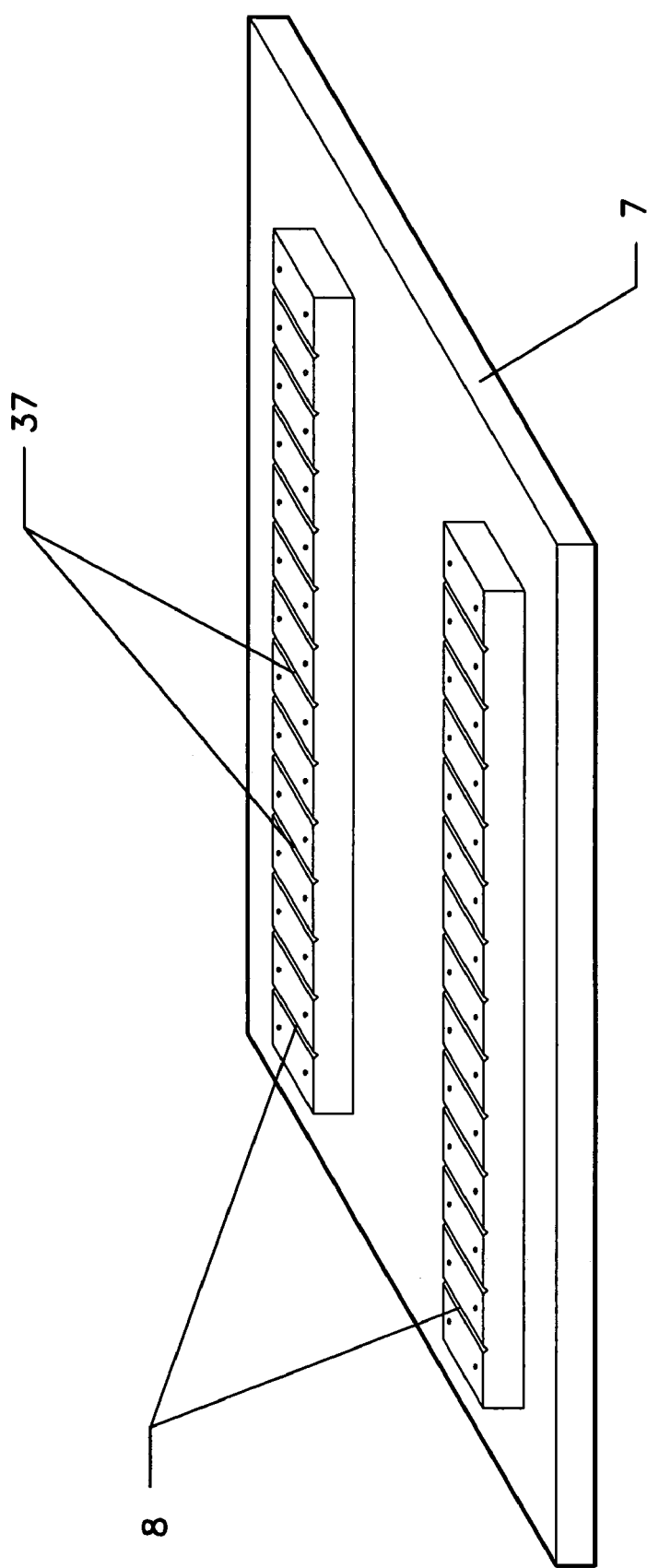
FIG. 8 is a drawing of one embodiment of a custom top plate that shows only a few of the hydraulic piston linkages being used to clamp two rows of parts.
Figure 9:
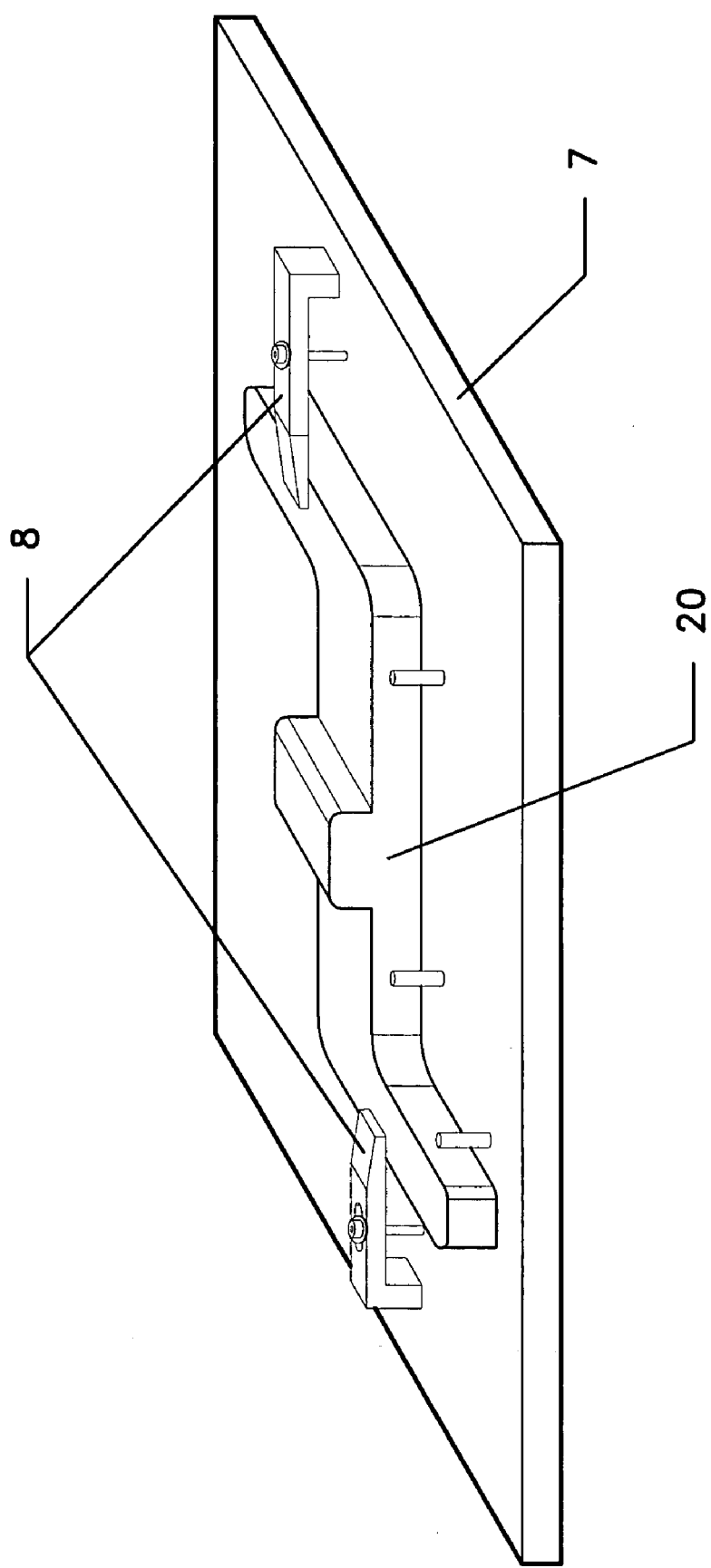
FIG. 9 is a drawing of one embodiment of a custom top plate that shows a few of the hydraulic piston linkages being used to clamp one irregular part.

In keeping with the broad goal of having a design that can provide a secure, careful and accurate means of holding, the system can utilize hydraulic pressure to activate the holding devices. This can provide secure and careful holding because the pressure can be adjusted to meet the need of the particular part—not too much pressure that might crush a hollow or fragile part, but high enough pressure when required for parts that will receive heavy machining. The parts can also be held securely because the hydraulic pressure can provide equal holding to all parts, even parts with different sizes or shapes. The pilot operated check valve (22) and the accumulator (24) can maintain relatively constant pressure in the system even when the hydraulic lines are disconnected providing secure holding. The pressure gage (23) can provide the operator with a means for monitoring the system pressure and therefore can confirm the holding security. The system can also provide for appropriate accuracy in holding. Accurate location holes (17) and corresponding pins (17) between the hydraulic pallet and the top plate, and accurate location holes (25) on the modular top plate can provide precise positioning and repeatability. When utilizing V blocks or other similar holding devices the bottom portion can be attached to the top plate (which can be mounted on the hydraulic plate and secured to the machining table) and then machined in place. FIG. 8 illustrates two pre-drilled strips of steel or aluminum or other material (8) that can be attached to the custom top plate as but one type of workholder device. The "V"s or other pattern can be machined into the blocks while they are in place. This can increase accuracy by compensating for any variances in the specific machining table, machining mechanism (arm, ball screw, etc), hydraulic plate or top plate. The V block top (see FIG. 10, #29) can then be attached.

In keeping with the broad goal of being able to clamp one or a large numbers of parts (160 or even 200 plus) at a time, the system can have a modular top plate (FIG. 6) which may be used to quickly and efficiently clamp one part by utilizing the appropriate holding device (collet, strap clamps, edge clamps, swing clamps, V blocks, custom clamps, etc.) and the bolt and location holes to secure the holding device to the top plate. A custom top plate may also be developed for a particular part or family of parts (see the example illustrated in FIG. 9). The piston linkage in the hydraulic plate can be removable (FIG. 4, #18) so the top plate can be machined to utilize only the cylinders that are desired. The system can also efficiently clamp many parts at a time (160+in this illustration since there are 80 cylinders and the V block, for example, holds two parts per device, but the design is certainly not limited to this number). A Modular top plate may be used to clamp the desired quantity of parts utilizing standard collets, V blocks or a variety of other holding devices. A custom top plate could also be easily developed to meet the needs of a special application. Whether custom or a standard design, the system can accommodate at least about an 80 movement site matrix, a 160 movement site matrix, or even a 200 movement site matrix.

In keeping with the broad goal of allowing for the ease, efficiency and safety of loading and unloading outside of the work environment, FIG. 1 illustrates that one pallet can be loaded or unloaded on the transfer table (2) while the other pallet is being machined. The table can serve as one type of a separate detachable workholder web configured transfer element. The system's hydraulic locking and unlocking mechanism can allow the operator to load a pallet, lock the parts in place, remove the hydraulic hoses and then load it into the machining environment. The accumulator (24) and pilot operated check valve (22) keep the parts locked. This ability to load and unload outside of the work environment can reduce operator fatigue because he/she can be able to load and unload the pallet while it is on the transfer table instead of leaning into the machining center or the like. Operator efficiency can be also improved by allowing the operator to be available to perform other duties while the parts are being machined. Safety is enhanced because the operator can be out of harms way from the machine being accidentally started, thus reducing possible injury. The operator can also be protected from the environment of the cutting fluids sprayed inside of the machine by minimizing the time that the operator is in the work environment.

By using multiple webs, the system can provide a rotatable pallet system. These pallets can be a preset pallet system, a multiple identical pallet system, a multiple hydraulic pallet system, or other configuration. Operators may rotate between more than one workholder web. At the transfer table, the second pallet may have its own separate supply of power or may have a connection to the main power system that powers (or merely charges) the movement web. There may even be peripheral hydraulic componentry at the remote location.

In keeping with the broad goal to improve operator efficiency while loading and unloading parts onto the pallet, the system can provide for the simultaneous, automatic clamping and releasing of all parts. When the remote mounted control valve (5) is moved to the lock position, all of the parts may be locked in place. When the release position is selected, the flow of hydraulic fluid is reversed releasing the hydraulic lock and providing hydraulic pressure to the opposite side of the piston pushing the holding device into the unlock position. Thus the system may include a positive release element (43) to affirmatively release the parts. This may be through a reverse force element or even through some type of bias element (44). As one type of a reverse force element, the system may include bi-directional movement mechanisms such as a bi-directional hydraulic cylinder as shown. This provides the advantage of improving operator efficiency by providing automatic and nearly instantaneous locking and unlocking of all parts. It also prevents the holding device from sticking by providing a positive and suitable force to release the holding mechanisms. The system can also reduce or eliminate the risk to the operator of carpel tunnel being caused by the repetitive mechanical clamping and unclamping of parts on a pallet.

In keeping with the broad goal of accommodating multiple methods of holding suitable to most any part, the system can provide a variety of options to meet this goal. First, the modular top plate can provide easy and quick linkage to the bi-directional hydraulic pistons (11) that can accommodate a wide variety of standard holding devices; for example, the system can provide for the easy setup with standard off the shelf 3C or 5C collets. This embodiment of the modular top plate will hold 1 to 80 3C or 5C collets. The collet housing (33) of either collet can be secured to the top plate with a 3C/5C lockdown flange (34) connected to the standard holding pattern of the modular top plate. The collet (31) can be connected to the 3C/5C adapter (32) that can be connected to the piston linkage (18) and then the hydraulic piston (11). The collet can be easily exchanged to the size appropriate for the part to be machined. Other examples include the collet housing cross-hole module (FIGS. 13 & 14) and the V block module (FIG. 10). The modular top plate can also utilize a variety of other holding devices (swing arms, edge locks, over center clamping, etc.) to hold a wide range of parts. Second, the system can provide for easy development of custom top plates. The plates can be prepared for easy and accurate attachment to the hydraulic plate. A wide variety of standard holding devices (as mentioned above) can be attached to the custom plate to meet the specific need. Thirdly, custom fixturing can be developed for mounting on either the modular top plate or the custom top plate. The system can complete much of the required work by providing a source of mechanical movement and pressure (such as from the hydraulic cylinders as the like) and a mounting base (such as a utility or custom top plate). The system can accommodate clamping by pushing or pulling, expanding or contracting; parts may be held externally or internally, in the vertical or horizontal position or a combination of both or any position; parts may be held by means of a sideways motion, swing motion, turning motion, teetering motion, over center motion, lever motioning, pushing motion or pulling motion, or any other motions.

In keeping with the broad goal to provide quick setup changeover from one part to another, the system can offer many different options. Since the system can be palletized, different parts can be set up on different pallets allowing for nearly instantaneous changeover from one part to another.

One pallet simply needs to be removed and replaced with the other pallet. If the tooling is in the machine and the program is stored, change over from one part to another can require only a few minutes. Another possibility is that multiple top plates can be set up and left set up for specific parts. When needed, the appropriate top plates can be quickly and accurately attached to the hydraulic plates and then exchanged when the job is complete. Another possibility is that since the pallet can accommodate many different kinds of clamping at the same time, different parts may be clamped on the same pallet and thereby one work center can supply multiple production cells with parts as needed. Another possibility is that one part may be clamped on a pallet in multiple ways to accommodate the different operations required for a particular part. After the machining cycle is complete, the parts can be rotated to the next operation on the pallet or removed if complete. This could allow for making a complete or more complete part reducing the overall lead-time and allowing for a continuous flow of parts. Another possibility is that the setup person may set the tooling for a given part to a fixed datum point on the pallet top plate and document the tooling requirements. When at a later time the part is to be set up again, since the parts position has been previously established, setup time may be minimized. Yet another possibility is that with a modular top plate, the 3C/5C top plate or other custom top plates, so much of the work of holding and fixturing can be done that even custom fixturing can be done accurately and efficiently minimizing changeover time. These systems may even have an unused location. This is possible in part because in one embodiment, the powering of the movement mechanisms can be accomplished internally to said topographically fixed movement web. The system may include an internal movement web, that is a web in which when configured for use, movement can be out of the way so that if a position is unused, the movement would not interfere with the part held in place regardless of its position. Thus it is possible to avoid use of at least one of the movement mechanisms.

Another important aspect of the invention is the ability to keep the pallet independent of the hydraulic power pack while it is in the work environment. As stated above, the pallet can be charged with hydraulic pressure and then the pressure may be maintained in the pallet after it is disconnected from the hydraulic pump. This can provide several benefits. It can allow for easier and faster removal and exchange of the two pallets. There may be no hydraulic lines connected to the pallet while it is being moved in or out of the machining environment which makes moving it simpler and easier and also does not limit the distance that the pallet can be moved. This can also reduce the overall cost of the unit because only one power pack may be required. Keeping the power pack out of the work environment can also minimize the wear and tear on the unit and the hydraulic lines.

Another important aspect of the invention can be that it may allow a person with only average skill to set up complex holding systems. The modular top plate can accommodate many types of parts. Even complex custom holding fixtures can be created more quickly and efficiently. The power (hydraulic to mechanical) to operate custom holding devices and the means to locate and fasten the device can be integral to the system and therefore much of the work necessary in developing a custom fixture may be already done.

An important aspect of this invention is its ability to function as a complete system of palletized work holding. As stated above, there are other inventions that accomplish one or more of the functions of this system but yet lack the versatility and adaptability necessary. This invention is a flexible system that has the capability of holding most any part securely, carefully and accurately; it can accommodate clamping one or large numbers of parts; it can provide the opportunity to load and unload parts outside of the work environment; it can provide simultaneous, automatic clamping of all parts; it can accommodate multiple methods of holding suitable to most any part; it can provide for quick setup changeover from one type of part to another; it can allow for developing custom fixture holding quickly and efficiently. These aspects are important individually and some of them are unique individually but collectively they form a powerful system that can make a significant contribution to the work holding demands of today's quick response market.

As can be easily understood from the foregoing, the basic concepts of the present invention may be embodied in a variety of ways. It involves both work holding techniques as well as devices to accomplish the appropriate work holding. In this application, the techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this provisional application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be included for the device described, but also method, business method, and process claims may be included to address the functions the invention and each element performs. Neither the description nor the terminology is intended to limit the scope of the claims which may be included.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure.

Further, each of the various elements of the invention and claims may also be achieved in a variety of manners. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "clamp" should be understood to encompass disclosure of the act of "clamping"—whether explicitly discussed or not—and, conversely, were there only disclosure of the act of "clamping", such a disclosure should be understood to encompass disclosure of a "clamp" and even a "means for clamping" Such changes and alternative terms are to be understood to be explicitly included in the description.

Any patents, publications, or other references mentioned in this application for patent are hereby incorporated by reference. In addition, as to each term used it should be understood that unless its utilization in this application is inconsistent with such interpretation, common dictionary definitions should be understood as incorporated for each term and all definitions, alternative terms, and synonyms such as contained in the Random House Webster's Unabridged Dictionary, second edition are hereby incorporated by reference. As to the references incorporated by reference, however, to the extent that such information or statements incorporated by reference might be considered inconsistent with the patenting of this/these invention(s) such statements are expressly not to be considered as made by the applicant(s).

Thus, the applicant(s) should be understood to have disclosure to claim at least: i) each of the holding systems as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the elements disclosed, and xi) each dependent claim as a dependency on each and every one of the independent claims presented. In this regard it should be understood that for practical reasons and so as to avoid adding potentially hundreds of claims, the applicant has presented the claims with initial dependencies only. Support should be understood to exist to the degree required under new matter laws—including but not limited to European Patent Convention Article 123(2) and United States Patent Law 35 USC 132 or other such laws—to permit the addition of any of the various dependencies or other elements presented under one independent claim as dependencies or elements under any other independent claim.

Further, if or when used, the use of the transitional phrase "comprising" should be understood as used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible.

The claims set forth in this specification by are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

INCORPORATED REFERENCES

| DOCUMENT NO. | DATE | NAME | CLASS | SUBCLASS | FILING DATE |
|---|---|---|---|---|---|
| 4,151,984 | May 01, 1979 | Zapart | 269 | 9 | May 14, 1978 |
| 4,153,239 | May 08, 1979 | La Rocco | 269 | 287 | Aug. 29, 1977 |
| 4,611,960 | Sep. 16, 1986 | Quenneville, et al | 409 | 234 | Jan. 25, 1985 |
| 4,898,238 | Feb. 06, 1990 | Grantom | 166 | 75.1 | Jun. 1, 1988 |
| 5,619,818 | Apr. 15, 1997 | Fredericksen | 43 | 4 | Aug. 28, 1995 |
| 5,647,707 | Jul. 15, 1997 | Poulin | 409 | 189 | Dec. 19, 1994 |
| 5,743,685 | Apr. 28, 1998 | Piggott | 409 | 131 | Jun. 2, 1994 |
| 6,062,554 | May 16, 2000 | Leonard | 269 | 153 | Nov. 5, 1998 |
| 6,099,215 | Aug. 8, 2000 | Piggott | 409 | 131 | Feb. 17, 1998 |
| 6,149,357 | Nov. 21, 2000 | Skellon | 409 | 132 | Nov. 12, 1999 |
| 6,149,358 | Nov. 21, 2000 | Montague | 409 | 225 | Jun. 4, 1999 |
| 6,174,114 | Jan. 16, 2001 | Stark | 409 | 225 | Feb. 13, 1998 |
| 6,206,622 B1 | Mar. 21, 2001 | Witte, et al. | 409 | 225 | Jun. 17, 1999 |

US Provisional Application, 60/230115, "Versatile Hydraulic Palletize Work Piece Holding", filed Sep. 5, 2000, 18 pages and 14 drawings

What is claimed is:

1. A versatile palletized work holder system comprising;
   a. a source of power;
   b. a topographically fixed movement web responsive to said source of power;
   c. a plurality of movement mechanisms responsive to said topographically fixed movement web and said source of power;
   d. a detachable workholder web responsive to at least one of said plurality of movement mechanisms;
   e. a plurality of attachment elements having a fixed relationship to said detachable workholder web; and
   f. at least one workholder device responsive to at least one of said attachment elements and at least one of said plurality of movement mechanisms, wherein said source of power comprises a hydraulic power source, wherein said topographically fixed movement web comprises a fluid connection element, and wherein said fluid connection element comprises at least two independent fluid manifolds.

2. The versatile palletized work holder system as described in claim 1 wherein said at least two independent fluid manifolds comprise at least two opposite direction fluid manifolds.

3. A versatile palletized work holder system comprising;
   a. a source of power;
   b. a topographically fixed movement web responsive to said source of power;
   c. a plurality of movement mechanisms responsive to said topographically fixed movement web and said source of power;
   d. a detachable workholder web responsive to at least one of said plurality of movement mechanisms;
   e. a plurality of attachment elements having a fixed relationship to said detachable workholder web; and
   f. at least one workholder device responsive to at least one of said attachment elements and at least one of said plurality of movement mechanisms wherein said source of power comprises a hydraulic power source, wherein said topographically fixed movement web comprises a fluid connection element, wherein said fluid connection element comprises a fluid manifold, and wherein said fluid manifold comprises a hydraulic fluid manifold.

4. A versatile palletized work holder system comprising:
   a. a source of power;
   b. a topographically fixed movement web responsive to said source of power;
   c. a plurality of movement mechanisms responsive to said topographically fixed movement web and said source of power;
   d. a detachable workholder web responsive to at least one of said plurality of movement mechanisms;
   e. a plurality of attachment elements having a fixed relationship to said detachable workholder web; and
   f. at least one workholder device responsive to at least one of said attachment elements and at least one of said plurality of movement mechanisms, wherein said detachable workholder web comprises a position lock element to which said workholder devices are responsive.

* * * * *